United States Patent [19]

Arikawa et al.

[11] Patent Number: 4,952,002
[45] Date of Patent: Aug. 28, 1990

[54] BRAKE FLUID PRESSURE CONTROL APPARATUS IN SKID CONTROL SYSTEM

[75] Inventors: Teturo Arikawa; Yasuhiro Maeda, both of Kanagawa, Japan

[73] Assignee: Nippon A.B.S., Tokyo, Japan

[21] Appl. No.: 287,456

[22] Filed: Dec. 21, 1988

[30] Foreign Application Priority Data

Dec. 29, 1987 [JP] Japan .............................. 62-200181
Feb. 16, 1988 [JP] Japan ................................ 63-19074

[51] Int. Cl.⁵ .............................................. B60T 8/40
[52] U.S. Cl. .................................... 303/116; 303/111
[58] Field of Search ........... 303/10, 110, 111, 113, 114, 303/115, 116, 119

[56] References Cited

U.S. PATENT DOCUMENTS

| | | | |
|---|---|---|---|
| 4,395,073 | 7/1983 | Arikawa | 303/116 |
| 4,421,361 | 12/1983 | Arikawa et al. | 303/92 |
| 4,453,782 | 6/1984 | Arikawa et al. | 303/116 |
| 4,805,967 | 2/1989 | Arikawa | 303/116 |
| 4,807,943 | 2/1989 | Ogino | 303/116 X |

Primary Examiner—Duane A. Reger
Attorney, Agent, or Firm—Jones, Day, Reavis & Pogue

[57] ABSTRACT

A brake fluid pressure control apparatus in a skid control system for a vehicle includes a fluid pressure control valve arranged between a master cylinder and a wheel brake operating apparatus; a brake relieving circuit connected to the fluid pressure control valve; a hydraulic reservoir for reserving brake fluid discharged through the fluid pressure control valve and the brake relieving circuit from the wheel brake operating apparatus and a fluid pressure pump for pressurizing brake fluid from the hydraulic reservoir for returning the brake fluid into a pressurized fluid supply conduit connecting the master cylinder with the fluid pressure control valve through a brake fluid returning circuit; and a valve apparatus arranged at the side of the master cylinder with respect to the connecting point between the pressurized fluid supply conduit and the brake fluid returning circuit, in the pressurized fluid supply conduit, the valve apparatus being able at least to cut off the fluid communication in the direction extending from the connecting point towards the master cylinder and a throttle in a conduit connecting the input side of the valve apparatus and the output side thereof.

13 Claims, 5 Drawing Sheets

BRAKE FLUID PRESSURE CONTROL APPARATUS IN SKID CONTROL SYSTEM

BACKGROUND OF THE INVENTION

1. Field of the Invention:

This invention relates to a brake fluid pressure control apparatus in a skid control system for a vehicle in which the brake fluid pressure to the wheel cylinder of the brake for the wheel is controlled in accordance with the rotational condition or skid condition of the wheel, and more particularly to a brake fluid pressure control apparatus of the type in which, when the brake for the wheel is relieved, brake fluid discharged through a fluid pressure control valve device from the wheel cylinder of the brake is returned to a pressure fluid supply conduit connected to a master cylinder by a fluid pump.

2. Description of the Prior Art:

Recently, various kinds of skid control systems have been developed for a vehicle by which skid control operation for the wheel is performed to avoid a locked wheel condition and obtain good braking performance on any road.

For example, in the apparatus disclosed by the Japanese Patent Publication Nos. 33738/1986 and 54619/1986, check valves, a throttle, hydraulic accumulator or a fluid pressure adjusting valve is used for reducing or preventing the brake pedal reacting force (the so-called "pedal kick-back" phenomenon) caused by the pulsation of the discharging fluid pressure of the fluid pressure pump. Operating noise can be reduced by the above-mentioned apparatus, too. However, the whole of the apparatus is large-sized and very heavy by the provision of the hydraulic accumulator or fluid pressure adjusting valve. Further, the apparatus is expensive.

SUMMARY OF THE INVENTION

Accordingly, it is an object of this invention to provide a brake fluid pressure control apparatus in a skid control system which can be small-sized, light and is reduced in cost, and further can reduce the brake pedal reacting force and operating noise.

In accordance with an aspect of this invention, a brake fluid pressure control apparatus in a skid control system for a vehicle comprises: (A) fluid pressure control valve means arranged between a master cylinder and wheel brake operating apparatus: (B) a brake relieving circuit connected to said fluid pressure control valve (C) a fluid hydraulic reservoir for reserving brake fluid discharged through said fluid pressure control valve means, from said wheel brake operating apparatus (D) a fluid pressure pump for pressurizing brake fluid from the hydraulic reservoir and for returning the brake fluid into a pressurized fluid supply conduit connecting said master cylinder with said fluid pressure control valve means through a brake fluid returning circuit (E) a valve apparatus arranged at the side of said master cylinder with respect to the connecting point between said pressurized fluid supply conduit and said brake fluid returning circuit, in said pressurized fluid supply conduit, said valve apparatus being able at least to cut off the fluid communication in the direction from said connecting point towards said master cylinder and (F) throttle means in a conduit connecting the input side of said valve apparatus and the output side thereof.

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENTS

Next, brake fluid pressure control apparatus in a skid control system, according to embodiments of this invention will be described with reference to the drawings.

Figure 1:
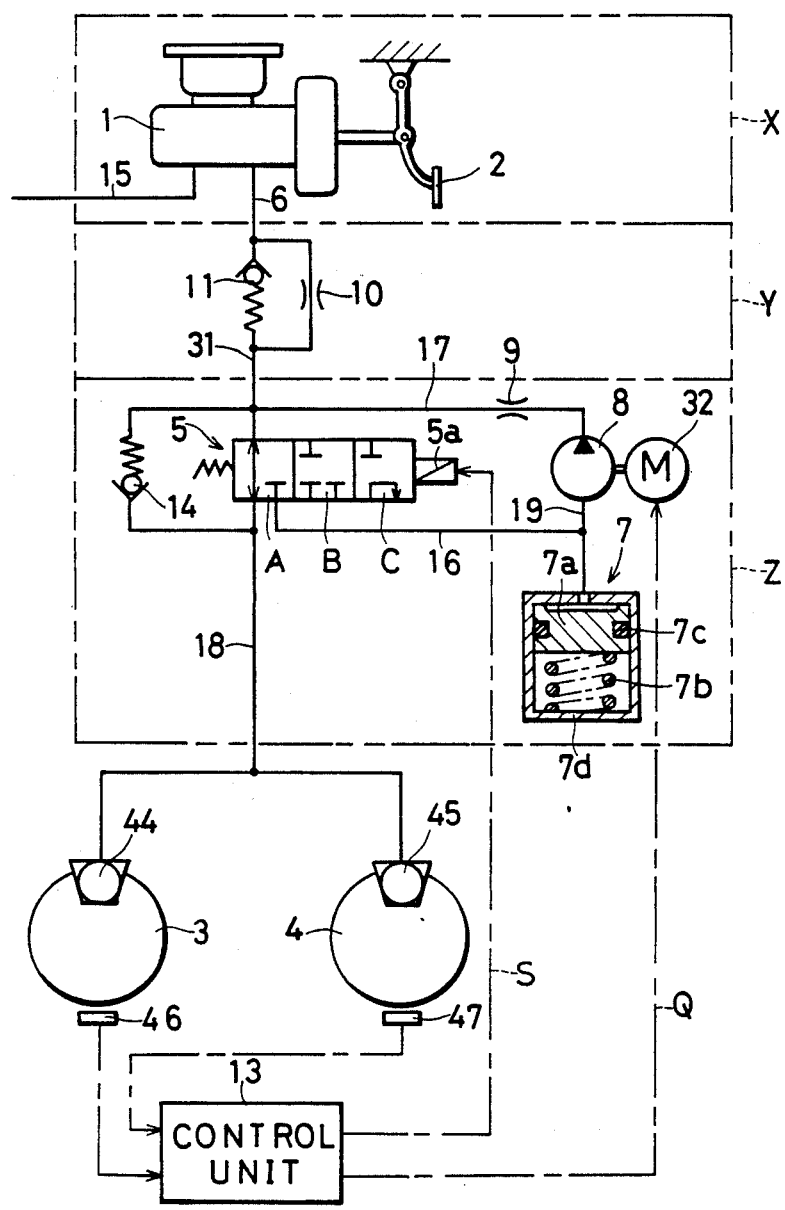
FIG. 1 to FIG. 5 are schematic views of brake fluid pressure control apparatus in a skid control system according to the first to fifth embodiments of this invention; respectively.

FIG. 1 shows a brake fluid pressure control apparatus in a skid control system according to a first embodiment of this invention. A tandem master cylinder 1 has the well-known structure, and it includes first and second pistons connected through a spring with each other. The first piston is connected to a brake pedal 2 to be operated by the driver. The cylinder body and the first and second pistons define first and second brake fluid pressure generating chambers, although not shown. The first brake fluid pressure generating chamber is connected through a conduit 6 for one brake conduit system. The second fluid pressure generating chamber is connected to a conduit 15. The conduit 6 is connected through a parallel circuit consisting of a check valve 11 and a throttle 10, a conduit 31, a three-port three-position electromagnetic changeover valve 5 and a conduit 18 to wheel cylinders 44 and 45 of the brake apparatus in a right front wheel 3 and a left rear wheel 4.

A discharging port of the electromagnetic changeover valve 5 is connected through a conduit 16 as a brake relieving circuit to a hydraulic reservoir 7. In the hydraulic reservoir 7, a piston 7a is slidably supported by a relatively weak spring 7b, in a bore of a body 7d, and a seal ring 7c is fitted to the piston 7a. A reserving chamber is formed by the body 7d and the piston 7a, communicating with the conduit 16. The hydraulic reservoir 7 is connected through a conduit 19 to an inlet of a fluid pressure pump 8. An outlet of the fluid pressure pump 8 is connected through a conduit 17 as a return circuit, and a throttle 9 is arranged in the conduit 17 extending to the connecting point between the parallel circuit of the throttle 10 and check valve 11, and the electromagnetic changeover valve 5.

The check valve 11 is open when brake fluid flows from the master cylinder 1 towards the electromagnetic changeover valve 5.

Wheel speed sensors 46 and 47 are associated with the front and rear wheels 3 and 4, and they generate pulse signals having frequencies proportional to the rotational speeds of the wheels 3 and 4. The pulse signals of the wheel speed sensors 46 and 47 are supplied to a control unit 13 which has the well-known circuits. On the basis of the detected outputs of the wheel speed sensors 46 and 47, the skid condition or rotational condition of the wheels 3 and 4, namely wheel speeds of the wheels 3 and 4, slips thereof, and accelerations or decelerations thereof are calculated or measured by the control unit 13.

A control signal S and a motor drive signal Q as the calculation or measurement results are generated from the control unit 13, and are supplied to a solenoid portion 5a of the changeover valve 5 and an electric motor 32 for driving the fluid pressure pump 8, respectively. Dashed lines represent electric lead wires.

Although schematically shown, the electromagnetic changeover valve 5 has well-known constructions.

The valve 5 takes anyone of three positions A, B and C in accordance with the current intensities of the control signal S.

When the control signal is "0" in current level, the valve 5 takes the first position A for increasing the brake pressure to the brakes for the wheels. In the first position A, the master cylinder side and the wheel cylinder side are connected. When the control signal S is "½" in current level, the valve 5 takes the second position B for maintaining the brake pressure to the brakes constant. In the second position B, the communications between the master cylinder side and the wheel cylinder side, and between the wheel cylinder side and the reservoir side are interrupted. When the control signal is "1" in current level, the valve 5 takes the third position C for decreasing the brake pressure to the brakes. In the third position C, the communication between the master cylinder side and the wheel cylinder side is interrupted, while the communication between the wheel cylinder side and the reservoir side is made. The brake fluid is discharged through the conduits 18, and 16 into the reservoir 7 from the wheel cylinders 44, 45.

When the control signal S initially becomes "1", the drive signal Q is generated, and it is kept during the skid control operation. The drive signal Q is supplied to the motor 32.

In addition, a check valve 14 which permits fluid to flow only from the wheel cylinder side towards the master cylinder side is connected in parallel with the electromagnetic changeover valve 5.

According to this invention, the throttle 9 is equal to another throttle means, the throttle 10 is equal to a first mentioned throttle means, and the check valve 11 is equal to a valve apparatus. The second fluid pressure generating chamber of the tandem master cylinder 1 is connected through the conduit 15 and circuits similar to the conduit circuits shown in FIG. 1, to wheel cylinders of a left front wheel and a right rear wheel. Thus, according to this embodiment, the wheel cylinders of the wheels are diagonally connected to the tandem master cylinder 1. Accordingly, the X-conduit system is employed for this embodiment.

Next, there will be described operation of the above-described apparatus of the first embodiment.

The driver starts to tread the brake pedal 2 in order to brake the vehicle running at constant speed. It is judged by the control unit 13 receiving the detecting signals of the wheel speed sensors 46 and 47 that the deceleration and slip of the wheels 3 and 4 do not still reach the predetermined slip and deceleration at the braking start. The control signal S of the control unit 13 is at the lower level "0". The solenoid portion 5a of the changeover valve 5 remains deenergized. The conduits 31 and 18 are connected. The brake fluid from the master cylinder 1 flows through the pressure fluid supply conduit 6, the check valve 11 and the conduit 18 into the wheel cylinders 44 and 45 to brake the wheels 3 and 4.

With the increase of the brake fluid pressure to the wheel cylinders 44 and 45, the slip or deceleration of the wheels 3 and 4 meanwhile reaches the predetermined slip or deceleration. The level of the control signal S assumes the higher level "1". The solenoid portion 5a of the changeover valve 5 is energized to cut off the communication between the conduits 31 and 18 and to make the communication between the conduits 18 and 16. Accordingly, the brake fluid from the wheel cylinders 44 and 45 flows through the conduits 18 and 16 into the reservoir 7. The fluid pressure pump 8 is so designed as to start to be driven at the time when the control signal S reaches the higher level "1", by the electric motor 32 and it continues to be driven during the skid control operation. The brake fluid in the reservoir 7 is presssurized by the fluid pressure pump 8, and it is led through the conduit 17 and the throttle 9 into the pressure fluid supply conduit 31.

The discharging fluid pressure of the fluid pressure pump 8 is applied through the first throttle 9 to the second throttle 10 and check valve 11. Since the check valve 11 is in the reverse direction with respect to the discharging fluid of the fluid pressure pump 8, the latter cannot flow through the check valve 11. Accordingly, the pressurized brake fluid from the fluid pressure pump 8 is supplied only through the first and second throttles 9 and 10 into the side of the master cylinder 1.

The opening of the first throttle 9 is considerably narrower than that of the second throttle 10. Thus, the output-side fluid pressure of the first throttle 9 is sufficiently low. The discharging fluid pressure of the fluid pressure pump 8 is considerably lowered by the first throttle 9. It is further lowered by the second throttle 10. Accordingly, even when the discharging pressure of the fluid pressure pump 8 is considerably high, the kick-back force to the brake pedal 2 is sufficiently reduced. The flow rate of the brake fluid to the master cylinder 1 is considerably suppressed by the throttles 9 and 10. Thus, the operating noise level can be sufficiently reduced.

When the skid conditions of the wheels 3 and 4 for relieving the brake are removed, the control signal S again becomes "0" or "½". The changeover valve 5 is changed over into the position A or B. In the position A, the conduits 31 and 18 are made to communicate with each other, and so the braking forces to the wheels 3 and 4 are increased. Or in the position B, the conduits 31 and 18 are cut off from each other, and the conduits 18 and 16 are cut off from each other, too. Thus, the braking forces to the wheels 3 and 4 are maintained constant.

The above-described control operations are repeated. Meanwhile, the vehicle speed reaches the desired speed, or the vehicle stops. The brake pedal 2 is released from treading. The brake fluid flows back through the conduit 18, the check valve 14 and the throttle 10 into the master cylinder 1 from the wheel cylinders 44 and 45. Thus, the wheels 3 and 4 are released from braking.

In the above first embodiment, the tandem master cylinder 1, the check valve 11, the electromagnetic changeover valve 5 and so on are constructed as one body. However, they may be constructed as separate bodies.

According to a modification of the first embodiment, the apparatus consists of three blocks X, Y and Z, as shown by the two-dash lines in FIG. 1. The first block X includes the tandem master cylinder 1 and the brake pedal 2. The second block Y includes the parallel circuit consisting of the check valve 11 and the second throttle 10. And the third block Z includes the electromagnetic changeover valve 5, the fluid pressure pump 8, the conduit 16 as the brake relieving circuit, the hydraulic reservoir 7 and so on. The block Y is assembled into the block X by the so-called "screw-in type" method. The block Z is connected to the assembly of the blocks X and Y through a connecting pipe. Or the block Y is assembled into the block Z, and the block X is connected to the assembly of the blocks Y and Z by a connecting pipe. Or the blocks X, Y and Z may be assembled into one another by the so-called "screw-in type" method. In all cases of the above block combinations, the operating noise level can be sufficiently lowered.

Figure 2:
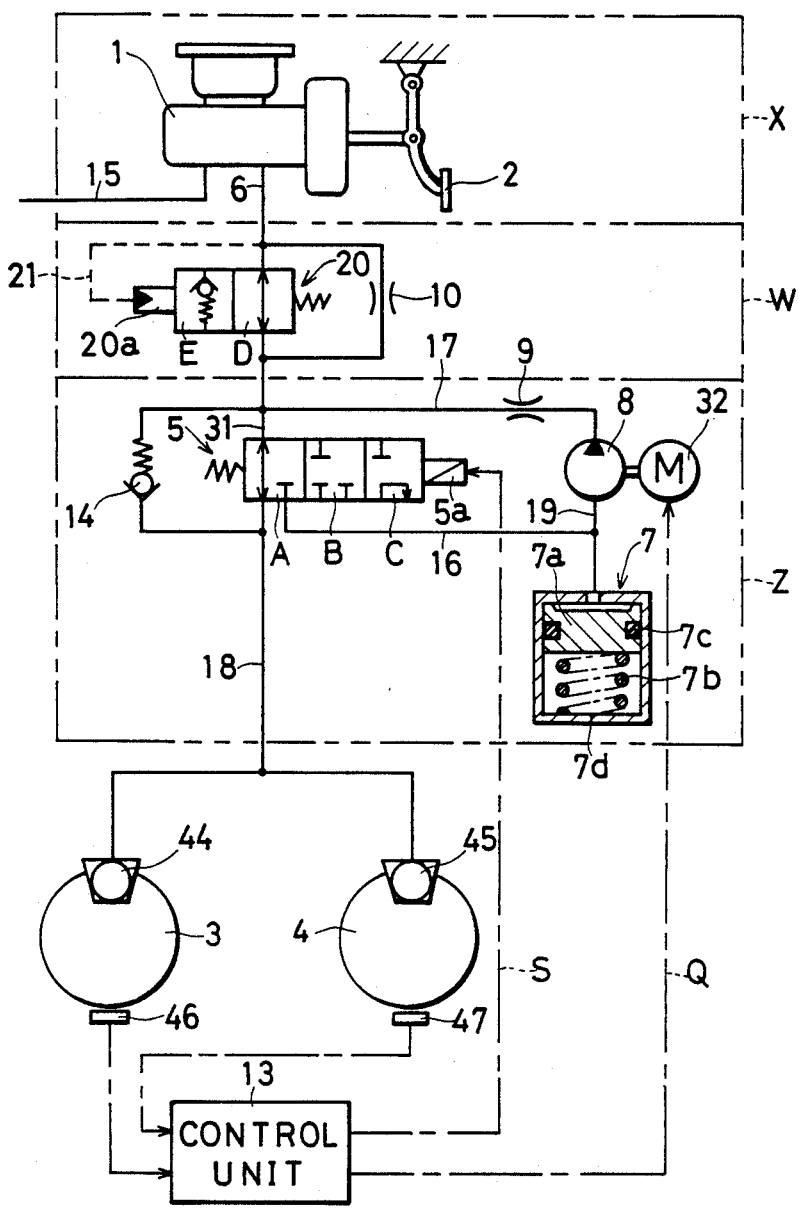

FIG. 2 shows a fluid pressure control apparatus in a skid control system according to a second embodiment of this invention. Parts in this embodiment which correspond to those in FIG. 1 are denoted by the same reference numerals, the description of which will be omitted.

The apparatus of this embodiment is different from that of FIG. 1 in construction of a valve apparatus.

In this embodiment, a valve apparatus 20 is arranged instead of the check valve 11 of FIG. 1, as a valve apparatus according to this invention.

The valve apparatus 20 takes normally a position D in which the side of the master cylinder 1 is made to communicate with the side of the electromagnetic changeover valve 5. A pressure-detecting conduit 21 divided from the conduit 6 is connected to a pressure-detecting portion 20a of the valve apparatus 20. When the pressure of the master cylinder 1, therefore the pressure of conduit 6 becomes higher than a predetermined value, the valve apparatus 20 is changed over into another position E in which it functions as a check valve. It permits fluid to flow from the side of the master cylinder 1 towards the side of the electromagnetic changeover valve 5.

The operations and effects of this embodiment are similar to those of the first embodiment. However, this embodiment has in addition the following effect.

When the brake pedal 2 is released from treading, in order to relieve the brake, the pressurized fluid from the wheel cylinders 44 and 45 starts to return through the second throttle 10 into the master cylinder side. When the pressure of the master cylinder 1 becomes lower than the predetermined value, the valve apparatus 20 is changed over into the position D and the side of the master cylinder 1 is made to communicate with the side of the electromagnetic changeover valve 5. After that, the pressurized brake fluid from the wheel cylinders 44 and 45 returns through the valve apparatus 20 into the master cylinder 1. Accordingly, the brake fluid from the wheel cylinders 44 and 45 can return sooner into the master cylinder 1 than that in the first embodiment.

According to a modification of the second embodiment, the apparatus consists of blocks X, W and Z as shown by the two-dash lines in FIG. 2. The block W includes the parallel circuit consisting of the valve apparatus 20 and the throttle 10.

The blocks X, W and Z may be assembled or combined as one body in the same manner as in the modification of the first embodiment.

Figure 3:
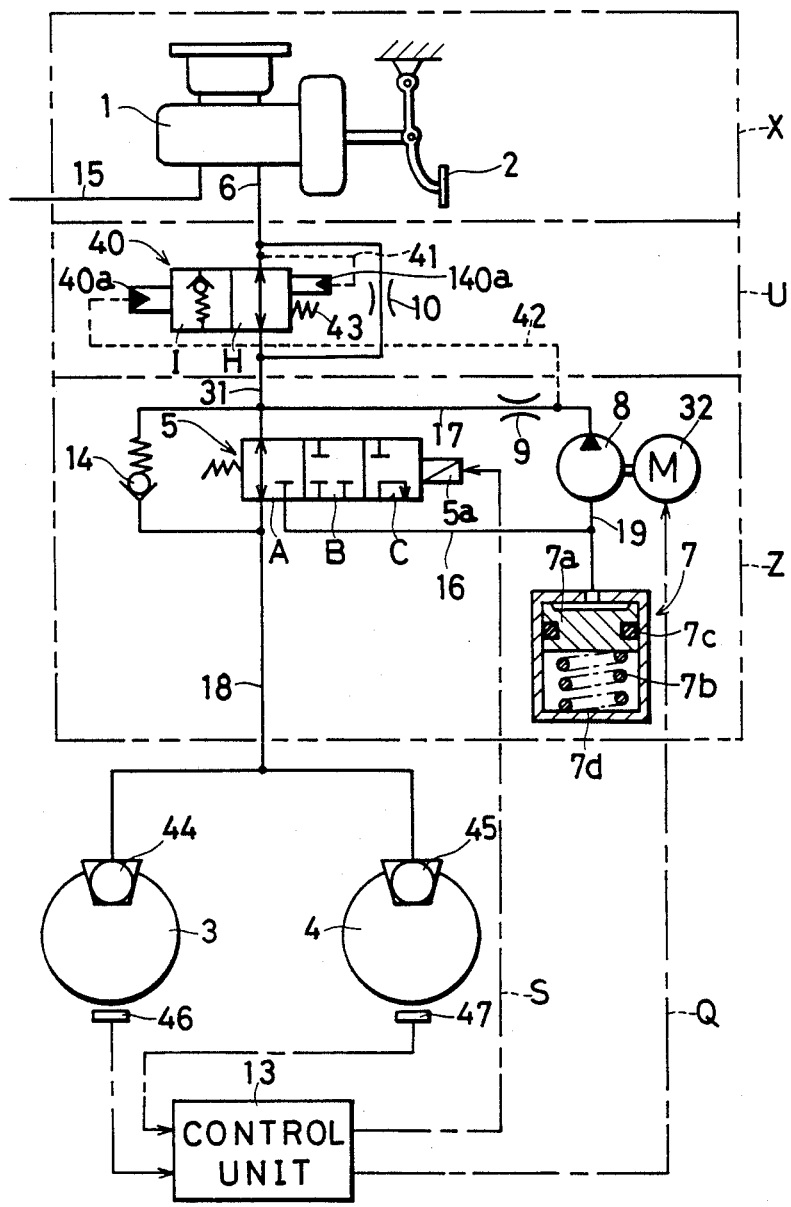

FIG. 3 shows a fluid pressure control apparatus in a skid control system according to a third embodiment of this invention. Parts in this embodiment which correspond to those in FIG. 1 are denoted by the same reference numerals, the description of which will be omitted.

The apparatus of this embodiment is different from that of FIG. 1 in construction of a valve apparatus. In this embodiment, a valve apparatus 40 is arranged instead of the check valve 11 of FIG. 1 as a valve apparatus according to this embodiment.

The valve apparatus 40 takes normally a position H in which the side of the master cylinder 1 is made to communicate with the side of the electromagnetic changeover valve 5. Pressure-detecting conduits 41 and 42 divided from the conduits 6 and 17 are connected to pressure-detecting portions 140a and 40a of the valve apparatus 40 respectively.

Thus, the discharging pressure of the fluid pressure pump 8 is compared with the pressure of the master cylinder 1.

When discharging pressure of the fluid pressure pump 8 becomes higher beyond a predetermined value than the pressure of the master cylinder 1, the valve apparatus 40 is changed over into the position I. The predetermined value is determined by the set load of a spring 43.

The operations and effects of this embodiment are similar to those of the first embodiment. However, this embodiment has further the following effect.

The valve apparatus 40 takes the position H before the fluid pressure of the fluid pressure pump 8 becomes higher beyond the predetermined value than the fluid pressure of the master cylinder 1. Accordingly, the discharging pressure of the fluid pressure pump 8 is returned directly to the side of the master cylinder 1 before that. However, it is not so high before that. Accordingly, the kick-back force to the brake pedal 2 is not so large.

When the brake pedal 2 is reliesed, to relieve the brake, the discharging pressure of the fluid pressure pump 8 is normally lowered very much, and so the valve apparatus 40 takes the position H. Thus, the pressurized fluid from the wheel cylinders 44 and 45 can be returned rapidly through the valve apparatus 40 into the master cylinder 1.

According to a modification of the third embodiment, the apparatus consists of blocks X, U and Z as shown by the two-dash lines in FIG. 3. The block U includes the parallel circuit consisting of the valve apparatus 40 and the throttle 10. The blocks X, U and Z may be arranged or combined as one body in the same manner as in the modification of the first embodiment.

Figure 4:
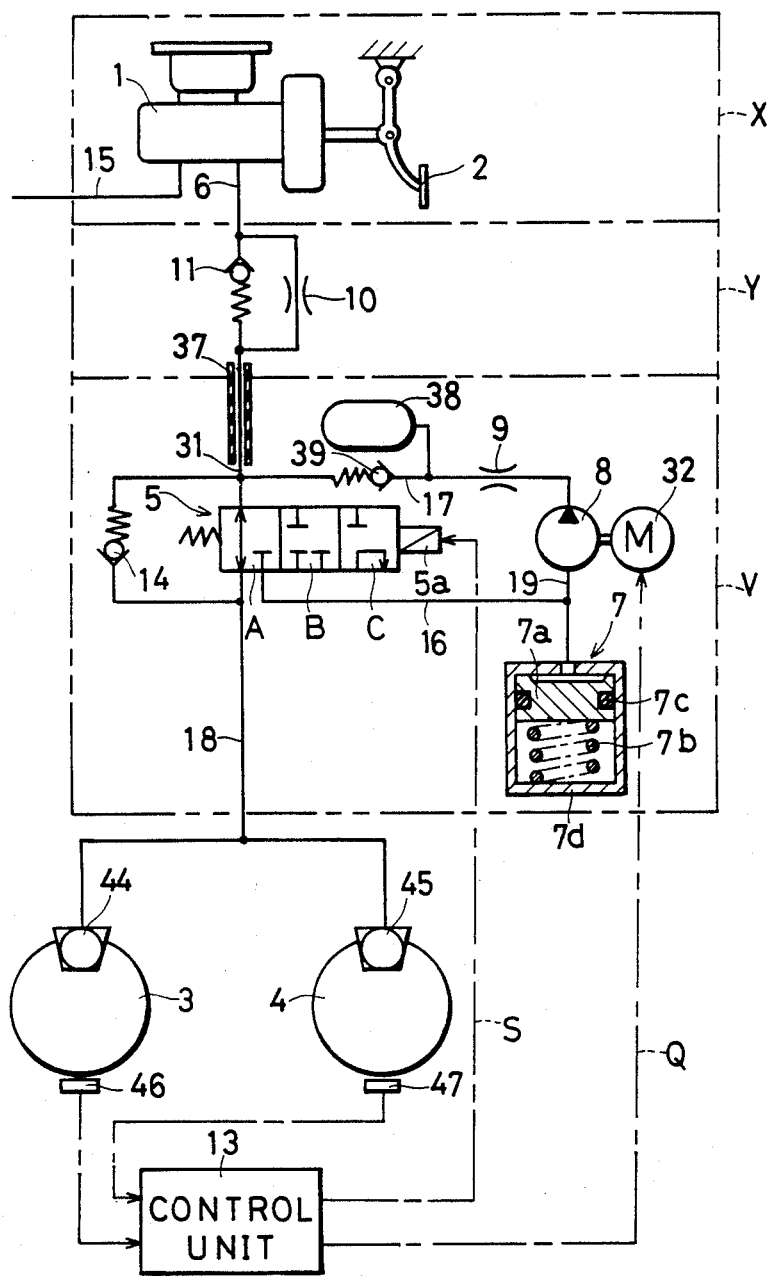

FIG. 4 shows a fluid pressure control apparatus in a skid control system according to a fourth embodiment of this invention. Parts in this embodiment which correspond to those in FIG. 1, are denoted by the same reference numerals, the description of which will be omitted.

In this embodiment, a part of the conduit 31 or the whole thereof is made of a rubber hose 37 which functions as damping material. In the fluid return circuit 17, a damping chamber 38 and a check valve 39 are arranged between the first throttle 9 and the conduit 31. The check valve 39 permits fluid to flow from the conduit 17 towards the conduit 31. The damping chamber 38 may be a well-known damping chamber. For example, such a damping chamber can be used that only a volume chamber may be formed in a tank. Or such a damping chamber may be used that a piston is slidably fitted into a cylinder, a volume chamber is formed at one side of the piston, into which the discharging pressure fluid of the fluid pressure pump 8 is supplied through the first throttle 9, and urging means such as spring is arranged at another side of the piston.

In this embodiment, the pulsation of the discharging fluid pressure of the fluid pressure pump 8 is attenuated not only by the first throttle 9, but also by the damping chamber 38 and rubber hose 37. Accordingly, the kick-back force to the brake pedal 2 can be reduced more. Further, the operating noise can be sufficiently absorbed by the rubber hose 37.

According to a modification of this embodiment, the apparatus consists of blocks X, Y and V. The block V includes the damping chamber 38, the check valve 39, the electromagnetic changeover valve 5 and so on. The assembly of the blocks X and Y is connected through the rubber hose 37 to the block V.

Figure 5:
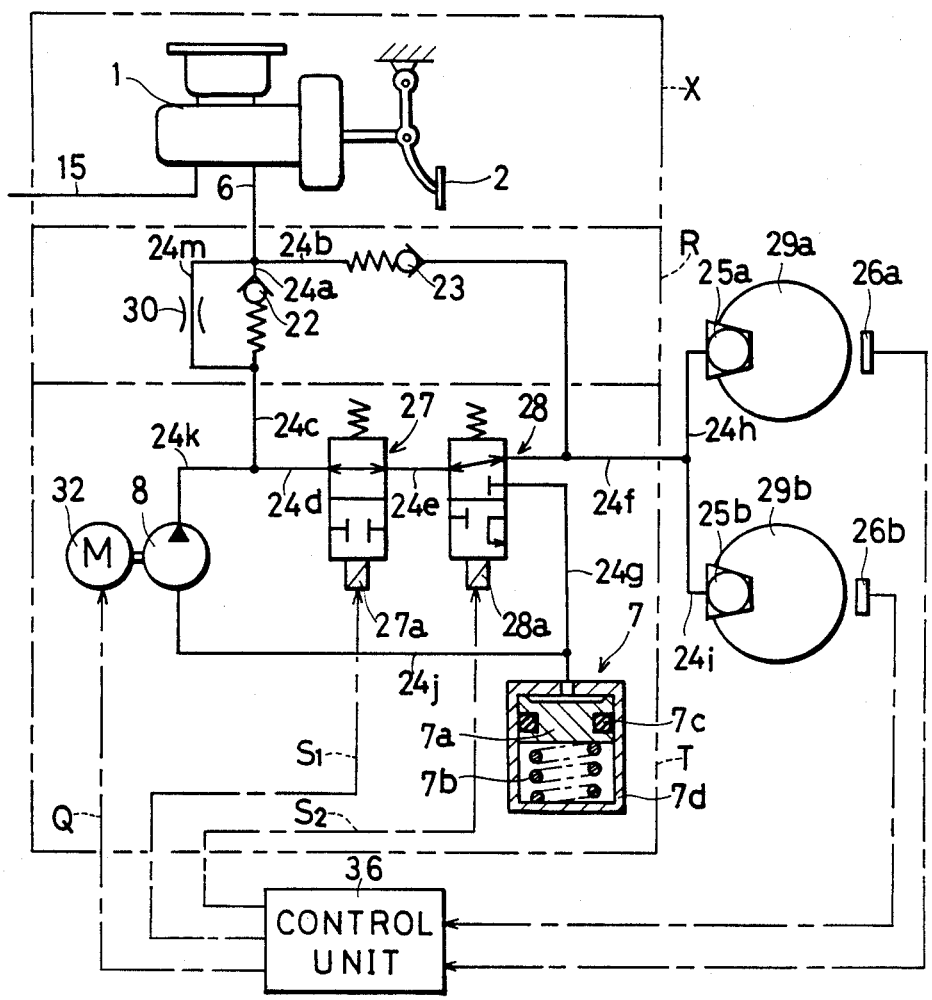

FIG. 5 shows a fluid pressure control apparatus in a skid control system according to a fifth embodiment of this invention. Parts in this embodiment which correspond to those in FIG. 1 are denoted by the same reference numerals, the description of which will be omitted.

The conduit 15 from the master cylinder 1 is connected through a conduit system similar to the conduit system shown in FIG. 5, to wheel cylinders of front wheels. The conduit 6 from the master cylinder 1 is divided into a brake fluid supply conduit 24a and a brake fluid return conduit 24b. The brake fluid supply conduit 24a is connected through a parallel circuit consisting of a throttle 30 and a first check valve 22, conduits 24c and 24d, an electromagnetic inlet valve 27 for fluid pressure control, a conduit 24e, an electromagnetic outlet valve 28 for fluid pressure control and conduits 24f, 24h and 24i to wheel cylinders 25a and 25b of brake apparatus in rear wheels 29a and 29b. Thus, the front-rear separation type conduit system is employed for this embodiment.

On the other hand, the brake fluid return conduit 24b is connected through a second check valve 23 and the conduits 24f, 24h and 24i to the wheel cylinders 25a and 25b of the rear wheels 29a and 29b. The first check valve 22 in the brake fluid supply conduit 24a permits fluid to flow from the master cylinder side towards the side of the inlet valve 27. The second check valve 23 in the brake fluid return conduit 24b permits fluid to flow from the wheel cylinder side towards the master cylinder side.

An outlet port of the outlet valve 28 is connected through the conduits 24f, 24h and 24i to the wheel cylinders 25a and 25b of the rear wheels 29a and 29b. A discharging port of the outlet valve 28 is connected through a conduit 24g to the hydraulic reservoir 7. It is further connected through a conduit 24j to the suction side of the fluid pressure pump 8. The discharging side thereof is connected through a conduit 24k to the conduit 24c.

Wheel speed sensors 26a and 26b are associated with the rear wheels 29a and 29b, and they generate pulse signals having frequencies proportional to the rotational speeds of the rear wheels 29a and 29b. The pulse signals of the wheel speed sensors 26a and 26b are supplied to a control unit 36 which is of well-known construction. On the basis of the detecting outputs of the wheel speed sensors 26a and 26b, the skid conditions or rotational conditions of the rear wheels 26a and 26b, namely wheel speeds of the rear wheels 26a and 26b, slips thereof, and accelerations or decelerations thereof are calculated or measured by the control unit 36. Control signals $S_1$ and $S_2$ as the calculation or measurement results are generated from the control unit 36, and are supplied to solenoid portions 27a and 28a of the electromagnetic inlet and outlet valves 27 and 28. Dash lines represent electric lead wires.

Although schematically shown, the electromagnetic inlet and outlet valves 27 and 28 have well-known constructions, and they are called also "cutoff valve", and "discharge valve", respectively. When the control signals $S_1$ and $S_2$ of the control unit 36 are at higher levels "1", the electromagnetic inlet and outlet valves 27 and 28 are energized to take lower positions respectively. And when the control signals $S_1$ and $S_2$ of the control unit 36 are at lower levels "0", electromagnetic inlet and outlet valves 27 and 28 are deenergized to take upper positions, respectively.

When the solenoid portions 27a and 28a of the inlet and outlet valves 27 and 28 are not energized, the master cylinder 1 communicates with the wheel cylinders 25a and 25b of the wheels 29a and 29b so that the brake pressure to the wheels 25a and 25b are increased. When both of the solenoid portions 27a and 28a of the inlet and outlet valves 27 and 28 are energized, the communication between the master cylinder 1 and the wheel cylinders 25a and 25b is cut off, and the discharge opening of the outlet valve 28 is connected to the wheel cylinders 25a and 25b to discharge brake fluid into the reservoir 7, so that the brake pressures to the wheels 29a and 29b are lowered. The brake fluid is returned through the conduits 24j and 24k to the conduits 24c and 6 by the pump 8. And when only the solenoid portion 27a of the inlet valve 27 is energized, the communication between the master cylinder 1 and the wheel cylinders 25a and 25b is cut off, and however, the supply opening of the outlet valve 28 continues to be connected with the wheel cylinders 25a and 25b, so that the brake pressures to the wheels 25a and 25b are maintained constant.

Next, there will be described operation of the above-described apparatus.

The driver starts to tread the brake pedal 2 in order to brake the vehicle running at constant speed. It is judged by the control unit 36 receiving the detecting signals of the wheel speed sensors 25a and 25b that the deceleration and slip of the wheels 29a and 29b do not still reach the predetermined slip and deceleration at the braking start. The control signals $S_1$ and $S_2$ of the control unit 36 are at the lower levels "0". The solenoid portions 27a and 28a of the inlet and outlet valves 27 and 28 are deenergized. The conduits 24d and 24f are made to communicate with each other. The brake fluid from the master cylinder 1 flows through the pressure fluid supply conduit 6, the first check valve 22, the throttle 30, the conduits 24c, 24d, the inlet and outlet valves 27 and 28, and the conduits 24f, 24h and 24i into the wheel cylinders 25a and 25b to brake the wheels 29a and 29b. On the other hand, the brake fluid from the master cylinder 1 is checked by the second check valve 23. Accordingly, it cannot flow through the pressure fluid return conduit 24b.

With the increase of the brake fluid pressure to the wheel cylinders 25a and 25b, the slip or deceleration of the wheels 29a and 29b meanwhile reaches the predetermined slip or deceleration. The levels of the control signals $S_1$ and $S_2$ become higher level "1". The solenoid portions 27a and 28a of the inlet and outlet valves 27 and 28 are energized to cut off the communication between the conduits 24d and 24e, and to make the communication between the conduits 24f and 24g. Accordingly, the brake fluid from the wheel cylinders 25a and 25b flows through the conduits 24h, 24i, 24f and 24g into the reservoir 7. The fluid pump 8 is so designed as to start to be driven at the time when any one of the control signals $S_1$ and $S_2$ becomes higher level "1", by the electric motor 32, and it continues to be driven during the skid control operation. The brake fluid in the reservoir 7 is pressurized by the fluid pump 8, and it is led through the conduit 24k into the pressure fluid supply conduit 24c.

The discharging fluid pressure of the fluid pressure pump 8 is applied to the throttle 30 and check valve 22. Since the check valve 22 is in the reverse direction with respect to the discharging fluid of the fluid pressure pump 8, the latter cannot flow through the check valve 22. Accordingly, the pressurized brake fluid for the fluid pressure pump 8 is supplied only through the throttle 30 into the side of the master cylinder 1.

The output-side fluid pressure of the throttle 30 is sufficiently low. The discharging fluid pressure of the fluid pressure pump 8 is considerably lowered by the throttle 30. Accordingly, even when the discharging pressure of the fluid pressure pump 8 is considerably high, the kick-back force to the brake pedal 2 is sufficiently reduced. The flow rate of the brake fluid to the master cylinder 1 is considerably suppressed by the throttle 30. Thus, the operating noise level can be sufficiently reduced.

Further, the brake fluid is not accumulated in a hydraulic accumulator, in contrast to the prior art. Accordingly, the required amount of the brake fluid is less than that in the prior art.

When the deceleration of the wheels 29a and 29b becomes higher than the predetermined deceleration level by function of the inlet and outlet valves 27 and 28, the control signal $S_2$ becomes lower "0", while the control signal $S_1$ remains higher "1", according to the control unit 36 of this embodiment. Accordingly, the solenoid portion 27a of the inlet valve 27 remains energized, while the solenoid portion 28a of the outlet valve 28 is deenergized. The communication between the conduits 24d and 24e is cut off, and the communication between the conduits 24f and 24g is cut off. Thus, the brake fluid pressure to the wheel cylinders 25a and 25b is maintained constant, or at the reduced value. Although the fluid pump 8 continues to be driven to lead the brake fluid from the reservoir 7 into the conduit 24c, little "kick-back" is imparted to the brake pedal 2. Further, the operating noise level is very low.

When the skid condition of the wheels 29a and 29b comes within the permissible range, both of the control signals $S_1$ and $S_2$ become lower "0" to make the communication between the conduits 24d and 24f and again to increase the braking of the wheels 29a and 29b.

The above-described control operations are repeated. Meanwhile, the vehicle speed reaches the desired speed, or the vehicle stops. The brake pedal 2 is released from treading. The fluid pressure at the side of the master cylinder 1 with respect to the check valve 23 becomes lower than the fluid pressure at the side of the wheel cylinders 25a and 25b with respect to it, with the release of the brake pedal 2, in the pressure fluid return conduit 24b. The brake fluid flows back through the conduits 24h, 24i, and 24b and the check valve 23 into the master cylinder 1 from the wheel cylinders 25a and 25b. Thus, the wheels 25a and 25b are almost released from braking.

However, when the fluid pressure of the wheel cylinder side with respect to the check valve 23 becomes lower than the minimum actuatable pressure of the check valve 23 which is, for example, determined by spring strength of a spring as a constituent, the check valve 23 cannot be opened, and the brake fluid cannot flow from the wheel cylinders 25a and 25b towards the master cylinder 1.

However, the throttle 30 is arranged in parallel with the first check valve 22. Accordingly, the brake fluid can return through the throttle 30 into the master cylinder 1. After the brake releasing, no pressure remains in the wheel cylinders 25a and 25b.

In the prior art, a hydraulic accumulator comprising a heavy spring and a large casing including a piston is used in the anti-skid system. Accordingly, the whole of the anti-skid system is large-sized and heavy. However, since such a hydraulic accumulator is not used, the apparatus according to this embodiment can be small and light.

According to a modification of the fifth embodiment, the apparatus consists of blocks X, R and T as shown by the two-dash lines in FIG. 5. The block R includes the parallel circuit consisting of the check valve 22 and the throttle 30, and the second check valve 23. The block T includes the inlet and outlet valves 27 and 28, the hydraulic reservoir 7 and so on.

The blocks X, R and T may be assembled or combined as one body in the same manner as in the modification of the first embodiment.

Or a part of the conduit 24c or the whole thereof may be made of a rubber hose as damping material, as the modification of the fourth embodiment. In that case, the assembly of the blocks X and R is connected through the rubber hose to the block T. Thus, the operating noise can be reduced more.

While the preferred embodiments have been described, variations thereto will occur to those skilled in the art within the scope of the present inventive concepts which are delineated by the following claims.

For example, in the second embodiment, the solenoid portion 20a of the valve apparatus 20 receives the pressure of the master cylinder 1 through the conduit 21. When it becomes higher than the predetermined value, the valve apparatus 20 is changed over to the position E from the position D. Instead, the discharging fluid pressure of the fluid pressure pump 8 or the fluid pressure of the first throttle 9 at the side of the conduit 17 may be applied to the pressure-detecting portion 20a of the valve apparatus 20. When it becomes higher than the predetermined value, the valve apparatus 20 is changed over to the position E.

Further, in the third embodiment, the one pressure-detecting portion 40a of the valve apparatus 40 receives the discharging fluid pressure of the fluid pressure pump 8 through the conduit 42 while the other pressure-detecting portion 140a thereof receives the pressure of the master cylinder 1 through the conduit 41. Instead, the one pressure-detecting portion 140a may receive the pressure of the conduit 18, namely the pressure of the wheel cylinders 44 and 45. When the discharging fluid pressure of the fluid pressure pump 8 becomes higher beyond a predetermined value than the pressure of the conduit 18, the valve apparatus 40 is changed into the position I. Further, the pressure detecting-portion 40a may receive the fluid pressure of the first throttle 9 at the side of the conduit 17.

Further, in the third embodiment, when the valve apparatus 40 is changed over into the position I, it functions as the check valve which permits fluid to flow from the master cylinder 1 towards the electromagnetic valve 5. However, in the position I, the valve apparatus 40 may function instead as a cutoff valve which cuts off the fluid communication between the master cylinder 1 and the electromagnetic valve 5. However, during the anti-skid control operation, when the vehicle removes from the low-$\mu$ (frictionally lower) road to the high-$\mu$ (frictionally higher) road (the so-called "$\mu$-jump"), the valve apparatus which functions as the check valve in the position I, is more preferable, because brake fluid can be immediately supplied to the wheel cylinders 44 and 45 from the master cylinder 1.

Any valve apparatus which can inhibit fluid at least from flowing from the connection point between the return circuit 17 and the conduit 31 towards the master cylinder side can be used as a valve apparatus of this invention.

In the embodiments of FIG. 1 to FIG. 4, the opening of the first throttle 9 is considerably narrower than that of the second throttle 10. However, the openings of the throttle 9 and 10 may be equal to each other. Further, in the above embodiments, the openings of the throttles 9 and 10 are fixed. However, one or both of the throttles 9 and 10 may be variable. In that case, the opening of the throttle can be changed in accordance with the situation of the road on which the vehicle is running. Further, it can be adjusted so that the operating noise during the anti-skid control operation can be reduced to the minimum.

Further in the forth embodiment, the rubber hose 37 and the damping chamber 38 are used. However, one of them may be omitted. Or a part of the conduit between the fluid pressure pump 8 and the first throttle 9 or all thereof may be made of a rubber hose as a damping material. Or a damping chamber may be arranged at the connecting point.

Further, in the above embodiments, the three-position electromagnetic changeover valve 5 is used. Instead, a two-position electromagnetic changeover valve may be used.

Further, in the embodiments of FIG. 1 to FIG. 4, the diagonal brake conduit system is employed. Instead, the so-called front-rear separation brake conduit system may be employed as the brake conduit system.

Further, in the above embodiments, the whole system for the four wheels is controlled by the two electromagnetic valves. Thus, the two-channel control is employed. Instead, one or three or four channel control may be employed.

Further, proportioning valves may be used for the wheel cylinders of the rear wheels, respectively.

Further, in the above embodiments, during the anti-skid control operation, the brake fluid pressure to the wheel cylinder is decreased, maintained constant and increased in accordance with the skid conditions of the wheels. Instead, it may be merely decreased and increased. In that case, the inlet valve 27 may be omitted in FIG. 5. Further, in the embodiment of FIG. 5, a circuit similar to the circuit shown in FIG. 5 is used for the front wheels. Instead, the circuit may be omitted for the front wheels. Or the anti-skid apparatus may be arranged for all the wheels, respectively.

This invention may be applied also to the two-wheeled vehicle.

Also in the embodiment of FIG. 5, the opening of the throttle 30 may be variable.

Further, a damping chamber may be connected to the side of the master cylinder 1 with respect to the throttle 30.

Further, in the embodiment of FIG. 5, the second check valve 23 and the conduit 24b may be omitted. In that case, it is preferable that a bypass conduit by-passing the inlet and outlet valves 27 and 28 is used and a check valve which permits fluid to flow towards the master cylinder side from the wheel cylinder side, is arranged at the conduit. Generally, the electromagnetic valves 27 and 28 include throttles. Accordingly, when the brake is relieved, each of them exhibits some resistance against fluid flow. The brake fluid returning to the master cylinder is retarded. However, when the above described check valve is arranged, the brake fluid can more rapidly return to the master cylinder 1 since the throttle resistance of the electromagnetic valve has no influence.

Further, the following valve apparatus may be used instead of the check valve 22 in FIG. 5.

Such a valve apparatus may be used that makes normally the master cylinder side and the side of the electromagnetic valves 27 and 28 communicate with each other. However, when the pressure of the master cylinder 1 becomes higher than a predetermined value, it functions as a check valve which permits fluid to flow from the master cylinder side towards the side of the electromagnetic valves 27 and 28. In this case, the second check valve 23 is omitted and the pressurized fluid from the wheel cylinders 25a, 25b can be returned rapidly and perfectly to the master cylinder.

In the alternative, a valve apparatus may be used that normally connects the master cylinder and the electromagnetic valves 27 and 28. When the discharging pressure of the fluid pressure pump 8 becomes higher beyond a predetermined value than the pressure of the master cylinder 1, it is changed over to the position for check valve. Further, in the embodiment of FIG. 5, one three-port three-position electromagnetic changeover valve may be used instead of the inlet and outlet valves 27 and 28.

The accuracy of the valve apparatus 11, 20 and 40 does not need to be so high, or the directional exactness does not need to be so strict. Accordingly, the valve apparatus may be cheap.

What is claimed is:

1. A brake fluid pressure control apparatus in a skid control system for a vehicle comprising:
    (A) fluid pressure control valve means arranged between a master cylinder and wheel brake operating apparatus;
    (B) a brake relieving circuit connected to said fluid pressure control valve means;
    (C) a hydraulic reservoir for reserving brake fluid discharged through said fluid pressure control valve means and said brake relieving circuit from said wheel brake operating apparatus;
    (D) a fluid pressure pump for pressurizing brake fluid of said hydraulic reservoir and for returning the brake fluid into a pressurized fluid supply conduit connecting said master cylinder with said fluid pressure control valve means through a brake fluid returning circuit;
    (E) a valve apparatus arranged at the side of said master cylinder with respect to a connecting point between said pressurized fluid supply conduit and said brake fluid returning circuit in said pressurized fluid supply conduit, said valve apparatus being able at least to cut off the fluid communication in the direction extending from said connecting point towards said master cylinder; and
    (F) throttle means arranged in a conduit connecting the input side of said valve apparatus and the output side thereof.

2. A brake fluid pressure control apparatus according to claim 1, in which another throttle means is arranged in said brake fluid returning circuit.

3. A brake fluid pressure control apparatus according to claim 2, in which at least one part of a conduit connecting said throttle means and said other throttle means is made of damping material.

4. A brake fluid pressure control apparatus according to claim 2 or 3, in which a damping chamber is arranged in a conduit connecting said fluid pressure pump with said other throttle means or in a conduit connecting said throttle means with said other throttle means.

5. A brake fluid pressure control apparatus according to claim 1, in which said valve apparatus is a check valve in which permits fluid to flow from said master cylinder towards said fluid pressure control valve means.

6. A brake fluid pressure control apparatus according to claim 1, in which said valve apparatus takes two positions, said valve apparatus taking normally one of said two positions to communicate the sides of said master cylinder and fluid pressure control valve means with each other, and taking the other of said two positions to function as a check valve which permits fluid to flow from said master cylinder towards said fluid pressure control valve means, when the fluid pressure of said master cylinder becomes higher than a predetermined value.

7. A brake fluid pressure control apparatus according to claim 1, in which said valve apparatus takes two positions and includes two pressure-detecting portions for detecting the fluid pressure of said master cylinder and the discharging fluid pressure of said fluid pressure pump respectively, said valve apparatus taking normally one of said two positions to communicate the sides of said master cylinder and fluid pressure control valve means with each other, and taking the other of said two positions to function as a check valve which permits fluid to flow from said master cylinder towards said fluid pressure control valve means, when it is detected by said pressure-detecting portions that the discharging fluid pressure of said fluid pressure pump becomes higher beyond a predetermined value than the fluid pressure of said master cylinder.

8. A brake fluid pressure control apparatus according to claim 1, in which said master cylinder is assembled in a first unit, said valve apparatus and said throttle means are assembled in a second unit, and said fluid pressure control valve means, said brake relieving circuit and said fluid pressure pump are assembled in a third unit, at least two of said first, second and third units being combined with one another as one body.

9. A brake fluid pressure control apparatus according to claim 2, in which said master cylinder is assembled in a first unit, said valve apparatus and said throttle means are assembled in a second unit, and said fluid pressure control valve means, said brake relieving circuit, said other throttle means and said fluid pressure pump are assembled in a third unit, at least two of said first, second and third units being combined with one another as one body.

10. A brake fluid pressure control apparatus according to claim 8 or 9, in which said second unit is combined through a rubber hose with said third unit.

11. A brake fluid pressure control apparatus in a skid control system for a vehicle comprising:

(A) a fluid pressure control valve device arranged between a master cylinder and a wheel cylinder of a brake for the wheel, said fluid pressure control valve device receiving control signals of a control unit measuring the skid condition of the wheel to control the brake fluid pressure to said wheel cylinder;

(B) a hydraulic reservoir which, when the brake fluid pressure to said wheel cylinder is decreased with control of said fluid pressure control valve device, reserves the brake fluid discharged through said fluid pressure control valve device from said wheel cylinder;

(C) a pressure fluid supply conduit connecting said master cylinder with said fluid pressure control valve device;

(D) a fluid pressure pump for pressurizing and returning the brake fluid from said hydraulic reservoir into said pressure fluid supply conduit;

(E) a first check valve arranged in said pressure fluid supply conduit, said first check valve being opened when the brake fluid flows from said master cylinder towards said fluid pressure control valve device, and the outlet of said fluid pump being connected to said pressure fluid supply conduit between said first check valve and said fluid pressure control valve device;

(F) a pressure fluid return conduit connecting said master cylinder with said wheel cylinder;

(G) a second check valve arranged in said pressure fluid return conduit, said second check valve being opened when the brake fluid flows from said wheel cylinder towards said master cylinder: and (H) throttle means arranged in a conduit connecting the input side of said first check valve and the output side thereof.

12. A brake fluid pressure control apparatus according to claim 11, in which said master cylinder is assembled in a first unit, said first and second check valves and said throttle means are assembled in a second unit, and said fluid pressure control valve device, said hydraulic reservoir and said fluid pressure pump are assembled in a third unit, at least two of said first, second and third units being combined with one another as one body.

13. A brake fluid pressure control apparatus according to claim 12, in which said second unit is combined through a rubber hose with said third unit.

* * * * *